(12) United States Patent
Hara et al.

(10) Patent No.: US 11,842,548 B2
(45) Date of Patent: Dec. 12, 2023

(54) PARKING SPACE RECOGNITION SYSTEM AND PARKING ASSIST SYSTEM INCLUDING THE SAME

(71) Applicant: HONDA MOTOR CO., LTD., Tokyo (JP)

(72) Inventors: Yuki Hara, Saitama (JP); Yasushi Shoda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 402 days.

(21) Appl. No.: 17/215,851

(22) Filed: Mar. 29, 2021

(65) Prior Publication Data
US 2021/0303881 A1    Sep. 30, 2021

(30) Foreign Application Priority Data
Mar. 31, 2020 (JP) .................. 2020-062703

(51) Int. Cl.
*G06V 20/58* (2022.01)
*B60W 30/06* (2006.01)
(Continued)

(52) U.S. Cl.
CPC ............ *G06V 20/586* (2022.01); *B60K 35/00* (2013.01); *B60W 30/06* (2013.01); *G06V 20/588* (2022.01);
(Continued)

(58) Field of Classification Search
CPC ... G06V 20/586; G06V 20/588; B60W 30/06; G08G 1/168
See application file for complete search history.

(56) References Cited

U.S. PATENT DOCUMENTS 9,399,400 B2   7/2016  Morimoto et al.
10,860,031 B2  12/2020 Sugano
(Continued)

FOREIGN PATENT DOCUMENTS

CN   104781122 A    7/2015
CN   108254752 A    7/2018
(Continued)

OTHER PUBLICATIONS

Machine translation of WO-2016002405-A1 (Year: 2016).*
(Continued)

*Primary Examiner* — John Villecco
*Assistant Examiner* — Courtney Joan Nelson
(74) *Attorney, Agent, or Firm* — Armstrong Teasdale LLP

(57) ABSTRACT

A parking space recognition system includes an external environment information acquiring device and a parking space candidate detecting device. The parking space candidate detecting device includes: a virtual line calculating unit configured to calculate a virtual line connecting road side ends of parking space lines adjacent to each other; an angle calculating unit configured to calculate an angle between the virtual line and one of the parking space lines; a parking type determining unit configured to determine a parking type; and a parking space candidate setting unit configured to set at least one provisional parking space in an area between the parking space lines based on positions of the parking space lines, and to set an available parking area among the provisional parking space to the parking space candidate.

8 Claims, 7 Drawing Sheets

(51) Int. Cl.
  *B60K 35/00* (2006.01)
  *G08G 1/16* (2006.01)
  *G06V 20/56* (2022.01)

(52) U.S. Cl.
  CPC ...... *G08G 1/168* (2013.01); *B60K 2370/1434* (2019.05); *B60W 2552/53* (2020.02)

(56) References Cited

U.S. PATENT DOCUMENTS

| | | | |
|---|---|---|---|
| 11,285,940 B2 | 3/2022 | Fan et al. | |
| 11,449,066 B2 | 9/2022 | Sugano | |
| 2013/0265429 A1* | 10/2013 | Yoon | G06V 10/44 348/148 |
| 2020/0062242 A1* | 2/2020 | Hayakawa | G08G 1/168 |
| 2022/0121214 A1 | 4/2022 | Sugano | |

FOREIGN PATENT DOCUMENTS

| | | | |
|---|---|---|---|
| CN | 109572684 A | 4/2019 | |
| CN | 110758379 A | 2/2020 | |
| JP | 2014104855 A | 6/2014 | |
| JP | 2014106738 A | 6/2014 | |
| JP | 2016016681 A | 2/2016 | |
| KR | 20170124299 A | 11/2017 | |
| WO | WO-2016002405 A1 * | 1/2016 | B60R 1/00 |

OTHER PUBLICATIONS

Office Action for Chinese Patent Application No. 202110339735.7 dated Jul. 16, 2023; 11 pp.

Notice of Reasons for Refusal for Japanese Patent Application No. 2020-062703; 13 pp.

* cited by examiner

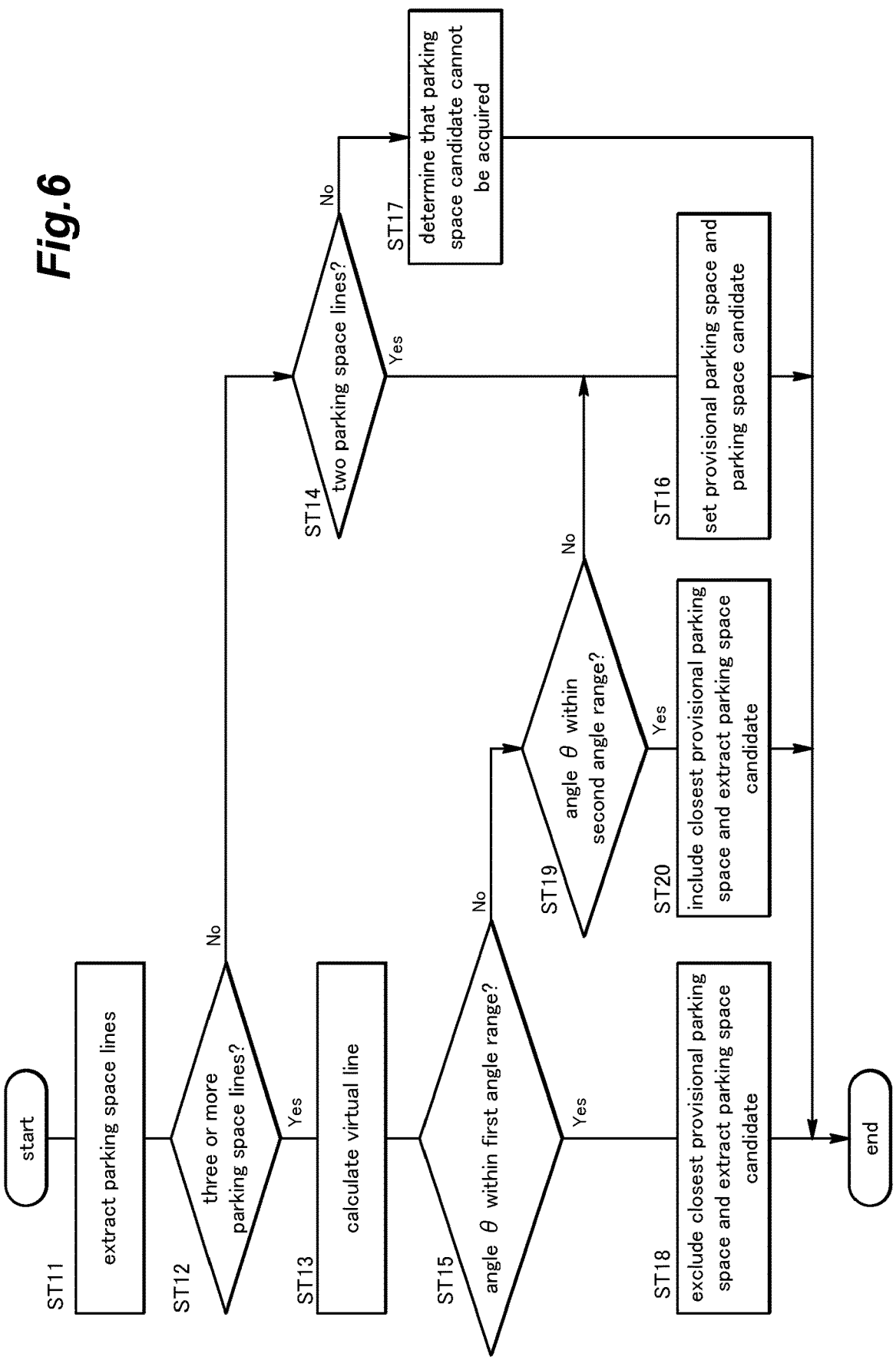

PARKING SPACE RECOGNITION SYSTEM AND PARKING ASSIST SYSTEM INCLUDING THE SAME

TECHNICAL FIELD

The present invention relates to a parking space recognition system for recognizing a parking space and to a parking assist system for autonomously moving a vehicle to the recognized parking space and parking the vehicle therein.

BACKGROUND ART

A known parking assist system includes a parking space recognition device mounted on an own vehicle (hereinafter simply referred to as "the vehicle"), detects a parking space located in front of the vehicle in the moving direction thereof, and notifies the driver of the parking space (for example, JP2016-016681A). The above parking space recognition device detects an available parking space (namely, a parking space where the vehicle can be parked) from the captured image of the front of the vehicle in the moving direction thereof based on the characteristics of parking space lines and a parking type. The characteristics of the parking space lines include the presence or absence of the parking space lines, the interval between the parking space lines, the shapes of the parking space lines, the color of the parking space lines, the angle between the moving direction of the vehicle and the parking space lines. The parking type represents a parking form (for example, perpendicular parking, angle parking, parallel parking) of the vehicle with respect to the parking space lines, and is determined by the parking space recognition device by using the angle between the moving direction of the vehicle and the parking space lines and the interval between the parking space lines adjacent to each other.

The angle between the moving direction of the vehicle and the parking space lines changes depending on the moving direction of the vehicle. Accordingly, for example, in a case where the vehicle approaches angle parking space lines (namely, parking space lines for the angle parking) from a direction perpendicular thereto, the angle between the moving direction of the vehicle and the angle parking space lines may become substantially 90 degrees, and thus the angle parking may be misidentified as the perpendicular parking.

SUMMARY OF THE INVENTION

In view of such a problem of the prior art, a primary object of the present invention is to prevent misidentification of a parking type in a parking space recognition system configured to determine the parking type and set a parking space and in a parking assist system for parking a vehicle in the parking space recognized by the parking space recognition system.

To achieve such an object, one embodiment of the present invention provides a parking space recognition system (S) mounted on a vehicle for recognizing at least one parking space between a plurality of substantially parallel parking space lines (55) provided on a side of a road (57), the parking space recognition system including: an external environment information acquiring device (7) configured to acquire positions of the parking space lines; and a parking space candidate detecting device (15) configured to detect a parking type and at least one parking space candidate based on the positions of the parking space lines, the parking type including angle parking and perpendicular parking, the parking space candidate being a candidate for an available parking area, wherein the parking space candidate detecting device includes: a virtual line calculating unit (61) configured to calculate a virtual line (57) connecting road side ends of the parking space lines adjacent to each other; an angle calculating unit (62) configured to calculate an angle (θ) between the virtual line calculated by the virtual line calculating unit and one of the parking space lines; a parking type determining unit (63) configured to determine the parking type based on the angle between the virtual line and the one of the parking space lines; and a parking space candidate setting unit (64) configured to set at least one provisional parking space (52X) in an area between the parking space lines based on the positions of the parking space lines, and to set an available parking area among the provisional parking space to the parking space candidate.

According to this configuration, the parking type is determined based on not the moving direction of the vehicle but the shapes of the parking space lines, so that misidentification of the parking type can be prevented.

In the above configuration, when three or more of the parking space lines are recognized, the parking type determining unit determines the parking type as the angle parking or the perpendicular parking.

According to this configuration, the parking type is determined as the angle parking or the perpendicular parking when three or more of the parking space lines are recognized. Accordingly, misidentification of the parking type can be prevented as compared with a case where the parking type is determined as the angle parking or the perpendicular parking when two of the parking space lines are recognized.

In the above configuration, when the angle calculated by the angle calculating unit is within a prescribed first angle range greater than 0 degrees and less than 180 degrees, the parking type determining unit determines the parking type as the angle parking, and when the angle calculated by the angle calculating unit is within a second angle range including 90 degrees and excluding the first angle range, the parking type determining unit determines the parking type as the perpendicular parking.

According to this configuration, it is possible to easily determine the parking type by determining the angle between the virtual line and the one of the parking space lines.

In the above configuration, the first angle range includes one prescribed angle range including 45 degrees or 135 degrees and another prescribed angle range including 60 degrees or 120 degrees.

According to this configuration, it is possible to appropriately park the vehicle in an angle parking space where the angle between the virtual line and the one of the parking space lines is substantially 45 degrees (or substantially 135 degrees) and in an angle parking space where the angle therebetween is substantially 60 degrees (or substantially 120 degrees).

In the above configuration, when the parking type determining unit determines the parking type as the angle parking, the parking space candidate setting unit does not set the parking space candidate between a first parking space line and a second parking space line, the first parking space line being the parking space line closest to the vehicle, the second parking space line being the parking space line adjacent to the first parking space line.

In a parking lot for the angle parking, it is often difficult to recognize the closest parking space line (namely, the parking space line closest to the vehicle) immediately after the vehicle enters the parking lot. Accordingly, the area between the closest parking space line and its adjacent parking space line may not be suitable for a parking position. According to the above configuration, areas other than the area between the closest parking space line (first parking space line) and its adjacent parking space line (second parking space line) are set to the parking space candidates. Accordingly, it is possible to prevent an area that is not suitable for a parking position from being set to the parking space candidate.

In the above configuration, when the parking type determining unit determines the parking type as the perpendicular parking, the parking space candidate setting unit sets the provisional parking space such that an area between a first parking space line and a second parking space line is included, the first parking space line being the parking space line closest to the vehicle, the second parking space line being the parking space line adjacent to the first parking space line.

According to this configuration, it is possible to appropriately set a larger number of provisional parking spaces. Accordingly, a wider variety of the parking space candidates can be presented to a user, so that the user can move the vehicle to a desired position and park the vehicle therein.

In the above configuration, in a case where at least two of the parking space lines are recognized, the parking space candidate setting unit sets the provisional parking space between the parking space lines.

According to this configuration, even if only two of the parking space lines are recognized, the provisional parking space is set between the two of the parking space lines. Accordingly, the parking space candidate is presented more easily, so that the convenience of the vehicle is enhanced.

Another embodiment of the present invention provides a parking assist system (1) for parking a vehicle in a parking space, the parking assist system including: the parking space recognition system described above; a display device (32) configured to display the at least one parking space candidate; a selection input member (35) configured to receive a selection operation of a target parking space by a user from among the at least one parking space candidate displayed on the display device; and a control device (15) configured to execute a driving process to autonomously move the vehicle to the target parking space based on a determination result of the parking space candidate detecting device.

According to this configuration, the vehicle can be parked autonomously in the target parking space.

Thus, according to the above configurations, it is possible to prevent misidentification of a parking type in a parking space recognition system configured to determine the parking type and set a parking space and in a parking assist system for parking a vehicle in the parking space recognized by the parking space recognition system.

BRIEF DESCRIPTION OF THE DRAWING(S)

FIG. 6 is a flowchart showing an extraction process.

DESCRIPTION OF THE PREFERRED EMBODIMENT(S)

In the following, an embodiment of the present invention will be described in detail with reference to the drawings.

A parking space recognition system S is included in a parking assist system 1 configured to assist the parking of a vehicle, and the parking assist system 1 is mounted on a vehicle such as an automobile provided with a vehicle control system 2 configured to move the vehicle autonomously.

Figure 1:
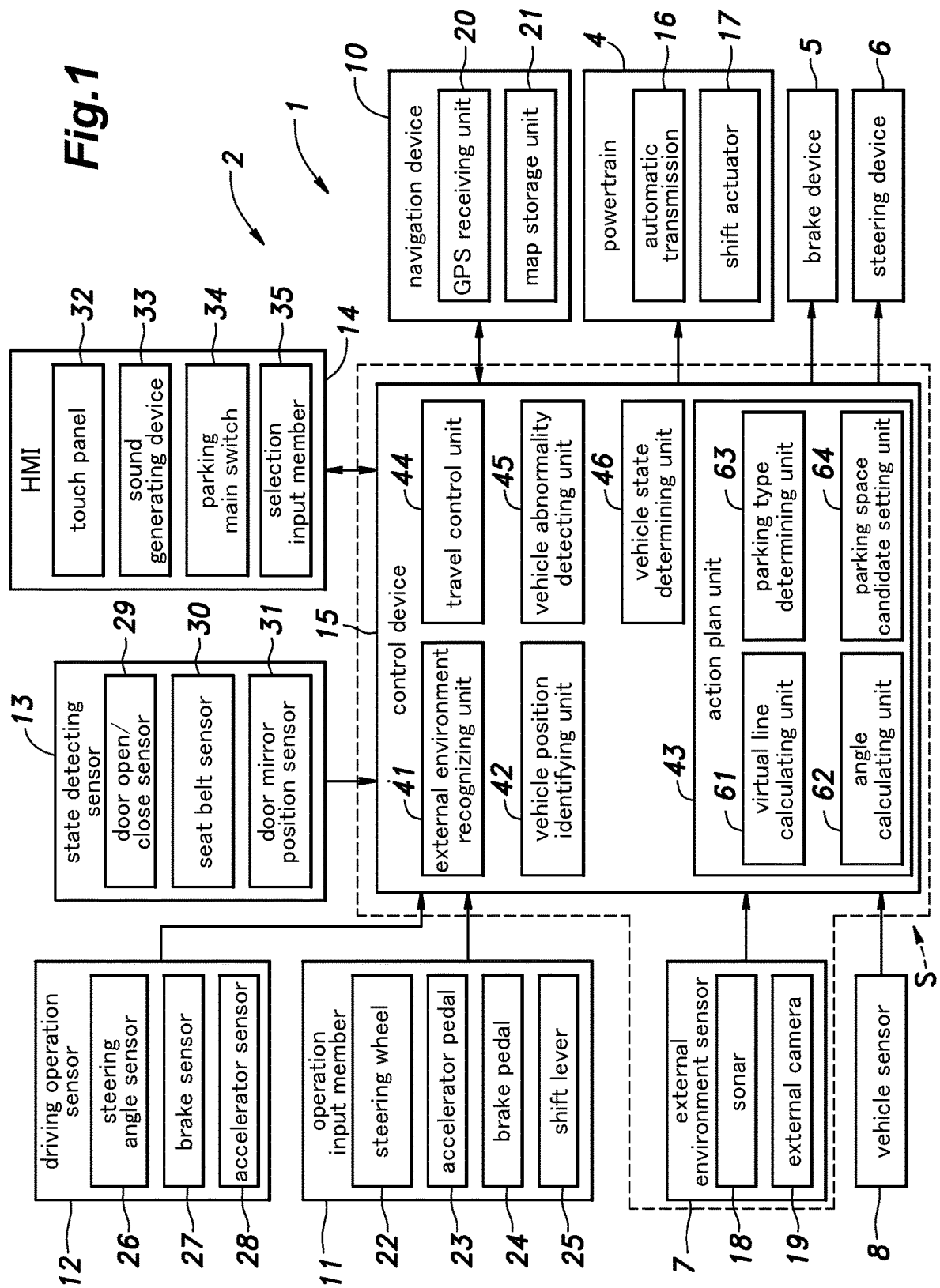
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to drive the brake caliper by an oil pressure. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquiring unit for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (an example of the user) to control the vehicle. The operation input member 11 includes a steering wheel 22, an accelerator pedal 23, a brake pedal 24 (brake input member), and a shift lever 25 (a shift member). The shift lever 25 is configured to receive an operation for selecting the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the moving direction as viewed from above. The control device 15 may generate the look-down image by combining the images of the front camera, the rear camera, and the left and right side cameras, and may generate the bird's-eye image by combining the image captured by the front camera or the rear camera facing the moving direction and the images captured by the left and right side cameras.

The parking assist system 1 is a system for executing the so-called automatic parking process and the so-called automatic unparking process, in which a vehicle is moved autonomously to a prescribed target space (a target parking space 53 shown in FIG. 3B or a target unparking space) selected by the occupant so as to park or unpark the vehicle.

The parking assist system 1 includes the control device 15, the external environment sensor 7 (the sonars 18 and the external cameras 19) as an external environment information acquiring device, the touch panel 32 as a display device configured to receive the selection operation, and the selection input member 35. The parking space recognition system S includes the control device 15 and the external environment sensor 7 (the sonars 18 and the external cameras 19) as the external environment information acquiring device.

The control device 15 controls the powertrain 4, the brake device 5, and the steering device 6 so as to execute an autonomous parking operation to move the vehicle autonomously to a target parking space 53 and park the vehicle at the target parking space 53 and an autonomous unparking operation to move the vehicle autonomously to a target unparking space and unpark the vehicle at the target unparking space. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may calculate a distance to the obstacle based on signals from the sonars 18 to obtain the position of the obstacle.

Figure 4:
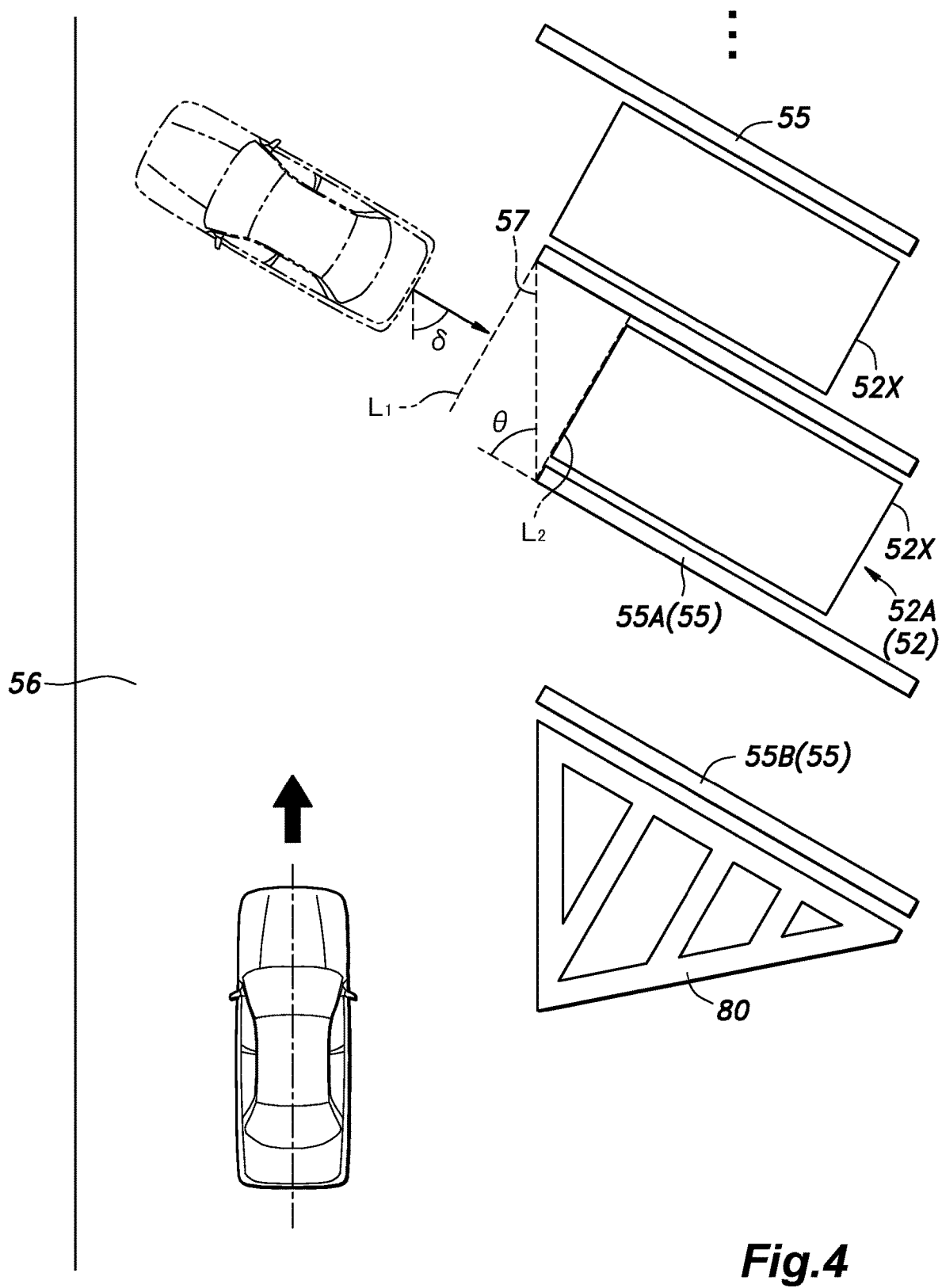
FIG. 4 is an explanatory diagram showing parking space lines and provisional parking spaces in a parking lot provided with angle parking spaces.
Figure 5A:
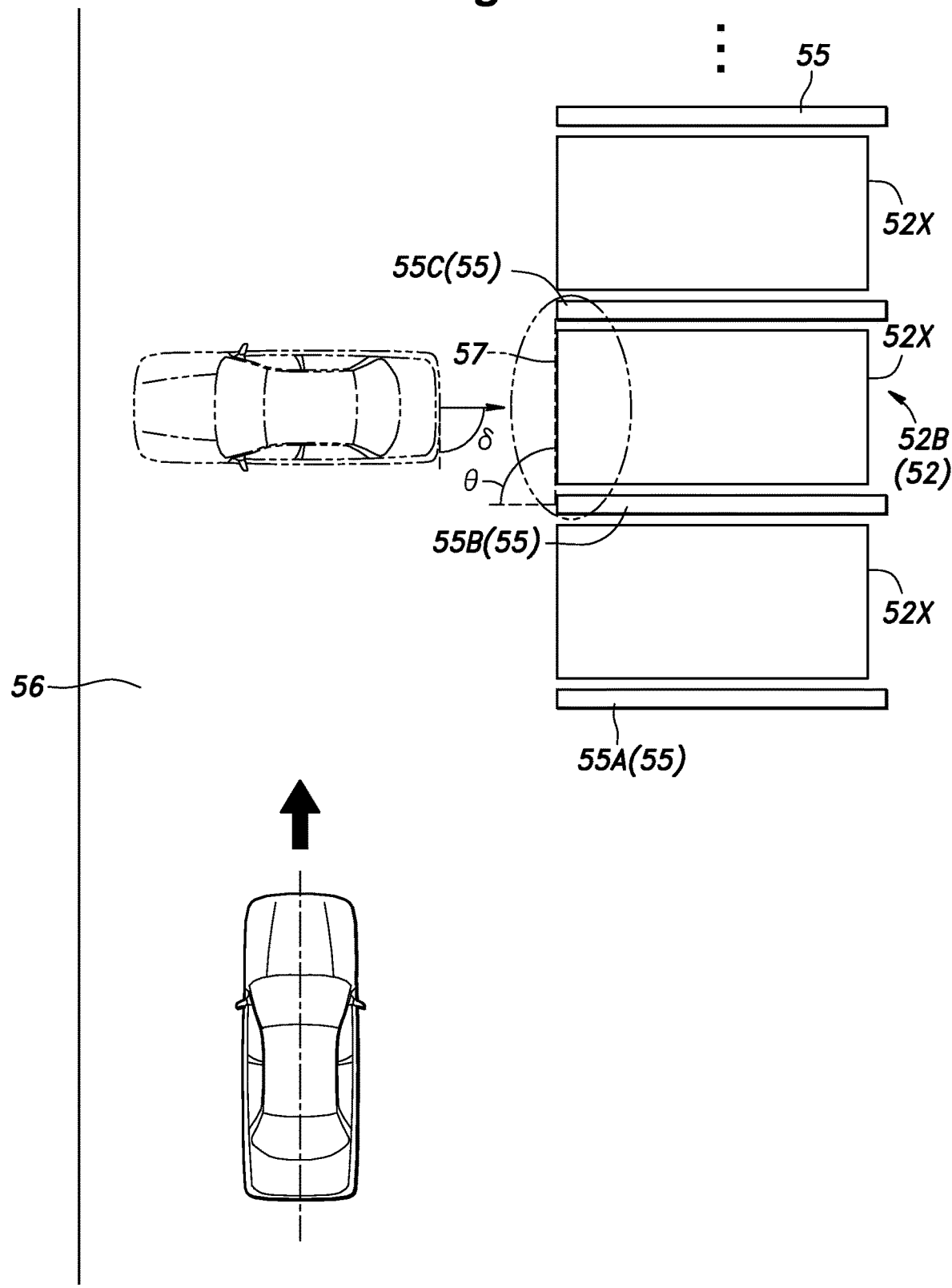
FIG. 5A is an explanatory diagram showing the parking space lines and the provisional parking spaces in a parking lot provided with perpendicular parking spaces.

Also, by analyzing the detection result of the external environment sensor 7 (more specifically, the images captured by the external cameras 19) based on a known image analysis method such as pattern matching, the external environment recognizing unit 41 can acquire, for example, the lanes on a road and parking space lines 55 (see FIGS. 4 and 5A). The lanes on the road are delimited by road signs. The parking space lines 55 consist of white lines or the like provided on a surface of a parking lot. The parking space lines 55 are delimiting lines for defining the boundaries on both lateral sides of at least one parking space 52.

The parking space lines 55 are arranged substantially parallel to each other and provided on a side (or a side edge) of a roadway 56 (road) on which the vehicle that has entered the parking lot moves. Each parking space line 55 forms a prescribed parking angle δ with respect to the extending direction of the roadway 56 (road). The parking space 52 where the vehicle is parked is defined between the parking space lines 55 adjacent to each other. The vehicle is moved to the parking space 52 in a prescribed direction forming the parking angle δ with respect to the extending direction of the roadway 56.

An angle θ (see FIGS. 4 and 5A) between a virtual line 57 and one of the parking space lines 55 (more specifically, an extension line of the central line of one of the parking space line 55 in the extending direction thereof; hereinafter simply referred to as "the parking space line 55") is equal to the parking angle δ. The virtual line 57 is a line connecting a roadway side end (namely, an end on a side of the roadway 56) of one parking space line 55 and a roadway side end of another parking space line 55 adjacent to the one parking space line 55. The parking angle δ is determined based on a parking type including angle parking and perpendicular parking. In the following, the angle θ between the two straight lines (the virtual line 57 and the parking space line 55) indicates the smaller of the angles between the two straight lines. Namely, the angle θ between the two straight lines is defined as an angle equal to or more than 0 degrees and equal to or less than 90 degrees.

In a case where the parking type is the angle parking, the parking angle δ is set to a prescribed numerical value equal to or more than 0 degrees and less than 90 degrees. In a case where the parking type is the angle parking, the parking angle δ may be set to 45 degrees or 60 degrees. On the other hand, in a case where the parking type is the perpendicular parking, the parking angle δ is set to 90 degrees.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to cause the vehicle to travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for moving the vehicle autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is moving at a low speed equal to or less than a prescribed vehicle speed (a vehicle speed at which a parking space candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first causes the touch panel 32 to display a parking search screen for setting the target parking space 53. After the target parking space 53 is set, the action plan unit 43 causes the touch panel 32 to display a parking screen. When executing the automatic unparking process, the action plan unit 43 first causes the touch panel 32 to display an unparking search screen for setting the target unparking space. After the target unparking space is set, the action plan unit 43 causes the touch panel 32 to display an unparking screen.

Figure 2:
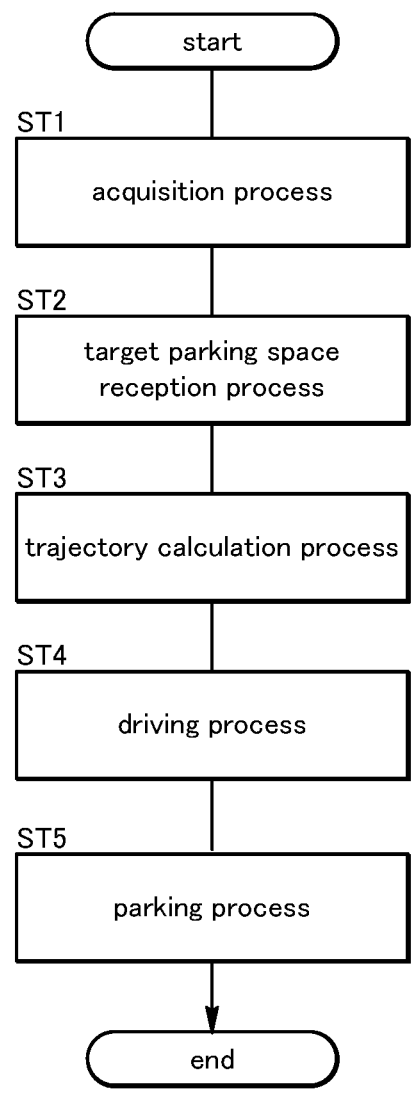
FIG. 2 is a flowchart of an automatic parking process.

Next, the automatic parking process will be described with reference to FIG. 2. First, the action plan unit 43 executes an acquisition process (step ST1) to acquire at least one parking space candidate 60, which is a candidate for an available parking area (namely, an area where the vehicle can be parked) and a target parking position where the vehicle is stopped. More specifically, in a case where the vehicle is stopped, the action plan unit 43 first causes the touch panel 32 of the HMI 14 to display a notification that instructs the occupant to move the vehicle straight. While the occupant (hereinafter referred to as "the driver") seated in the driver's seat is moving the vehicle straight, the external environment recognizing unit 41 acquires the positions and sizes of the obstacles and the positions of the parking space lines 55 based on the signal from the external environment sensor 7. The action plan unit 43 executes a process (hereinafter referred to as "the extraction process") to extract the parking space candidate 60, which is an available parking space 52 (namely, a parking space 52 where the vehicle can be parked) delimited by the parking space lines 55, based on the positions and sizes of the obstacles and the positions of the parking space lines 55 acquired by the external environment recognizing unit 41.

In a case where the vehicle moves a prescribed distance and at least one parking space candidate 60 has been extracted, the action plan unit 43 notifies the driver that the parking space candidate 60 has been extracted. This notification to the driver may be given by the display on the touch panel 32 or the voice generated by the speaker.

Figure 3A:
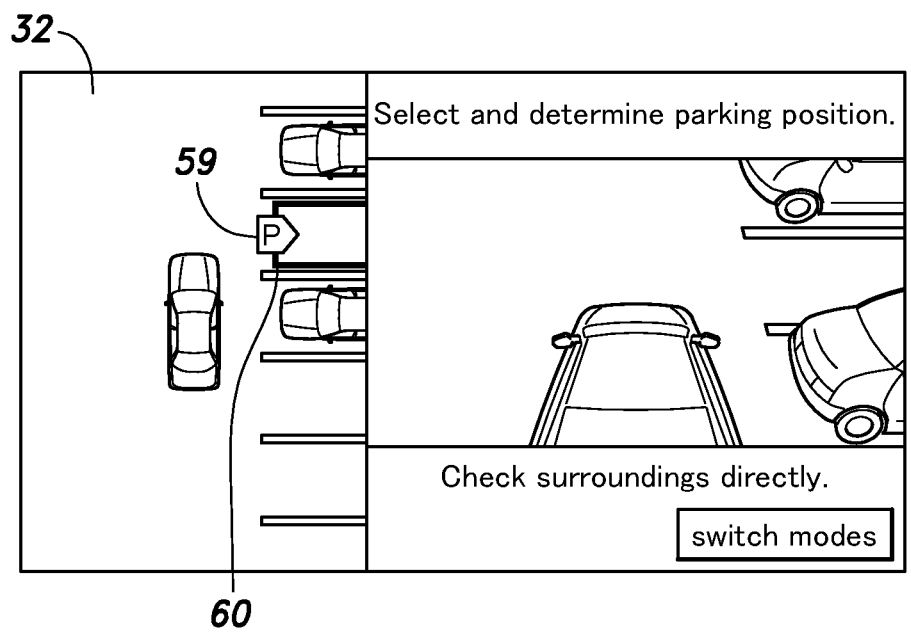
FIG. 3A is a diagram showing a screen display (parking search screen) of a touch panel during a target parking space reception process.

Thereafter, the action plan unit 43 causes the touch panel 32 to display at least one parking space candidate 60 that has been acquired, and executes a target parking space reception process (step ST2) to receive a selection operation by the occupant. The selection operation is an operation to select a target parking space 53 where the occupant wants to park the vehicle from among at least one parking space candidate 60 displayed on the touch panel 32. More specifically, the action plan unit 43 causes the touch panel 32 to display the look-down image and the bird's-eye image in the moving direction on the parking search screen shown in FIG. 3A. Upon acquiring at least one parking space candidate 60, the action plan unit 43 causes the touch panel 32 to display a frame that indicates the parking space candidate 60 and an icon 59 that corresponds to the frame such that the frame and the icon 59 are superimposed on at least one of the above surrounding images (namely, at least one of the look-down image and the bird's-eye image). The icon consists of a symbol (see "P" in FIG. 3A) indicating the parking space candidate 60. Also, the action plan unit 43 causes the parking search screen of the touch panel 32 to display a notification to instruct the driver to stop the vehicle and set a parking position (target parking space 53) so as to receive the selection operation of the target parking space 53. This selection operation of the target parking space 53 may be performed via the touch panel 32, or may be performed via the selection input member 35.

Next, after the target parking space 53 is selected by the driver, the action plan unit 43 executes a trajectory calculation process (ST3) to calculate a trajectory of the vehicle to the target parking space 53. Incidentally, in a case where the trajectory to the target parking space 53 cannot be calculated, the action plan unit 43 may return to step ST1 and again give the notification that instructs the driver to move the vehicle straight. Further, in a case where the trajectory to the target parking space 53 cannot be calculated after a plurality of parking space candidates 60 have been acquired, the action plan unit 43 may cause the touch panel 32 to display the parking space candidates 60 other than the parking space candidate 60 selected by the driver, thereby receiving the selection of a new target parking space 53. When the new target parking space 53 is selected, the action plan unit 43 may again calculate the trajectory of the vehicle to the target parking space 53.

Figure 3B:
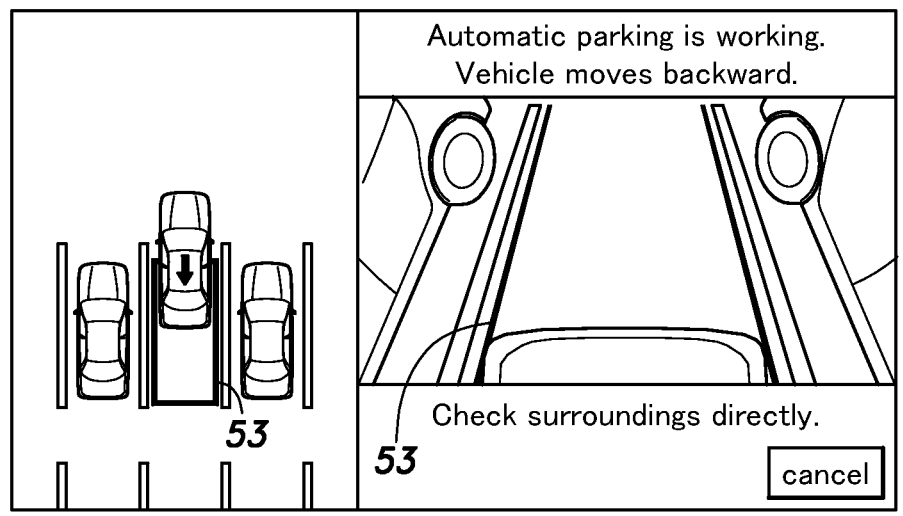
FIG. 3B is a diagram showing the screen display (parking screen) of the touch panel during a driving process.

When the calculation of the trajectory of the vehicle to the target parking space 53 is completed, the action plan unit 43 causes the touch panel 32 to switch the screen from the parking search screen to the parking screen. As shown in FIG. 3B, the parking screen is a screen in which a moving direction image (front image or back image) in the moving direction of the vehicle is displayed on the right half of the touch panel 32 and the look-down image including the vehicle and its surrounding area is displayed on the left half thereof. At this time, the action plan unit 43 may cause the touch panel 32 to display a thick frame that indicates the target parking space 53 selected from among the parking space candidates 60 such that the thick frame is superimposed on the look-down image.

After the screen of the touch panel 32 is switched to the parking screen, the action plan unit 43 executes a driving process (step ST4) to move the vehicle along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle moves along the calculated trajectory. At this time, the action plan unit 43 controls the powertrain 4, the brake device 5, and the steering device 6 so as to execute a switching operation for switching the moving direction of the vehicle (a reversing operation for reversing the moving direction of the vehicle). The switching operation may be executed repeatedly, or may be executed only once.

During the driving process, the action plan unit 43 may acquire the moving direction image from the external cameras 19 and cause the touch panel 32 to display the acquired moving direction image on the right half thereof. For example, as shown in FIG. 3B, when the vehicle is moving backward, the action plan unit 43 may cause the touch panel 32 to display an image to the rear of the vehicle captured by the external cameras 19 on the right half thereof. While the action plan unit 43 is executing the driving process, the surrounding image of the vehicle (the own vehicle) in the look-down image displayed on the left half of the touch panel 32 changes along with the movement of the vehicle. When the vehicle reaches the target parking space 53, the action plan unit 43 stops the vehicle and ends the driving process.

When the vehicle state determining unit 46 determines that the vehicle is in the prohibition state during the driving process, the action plan unit 43 causes the touch panel 32 to display a notification that the automatic parking is suspended or canceled and executes a deceleration process to decelerate the vehicle to stop the same. Thus, when there is a predetermined operation input by the occupant via the operation input member 11, the action plan unit 43 executes the deceleration process. Accordingly, it is possible to avoid uneasiness felt by the occupant due to the continuation of the movement of the vehicle.

Figure 3C:
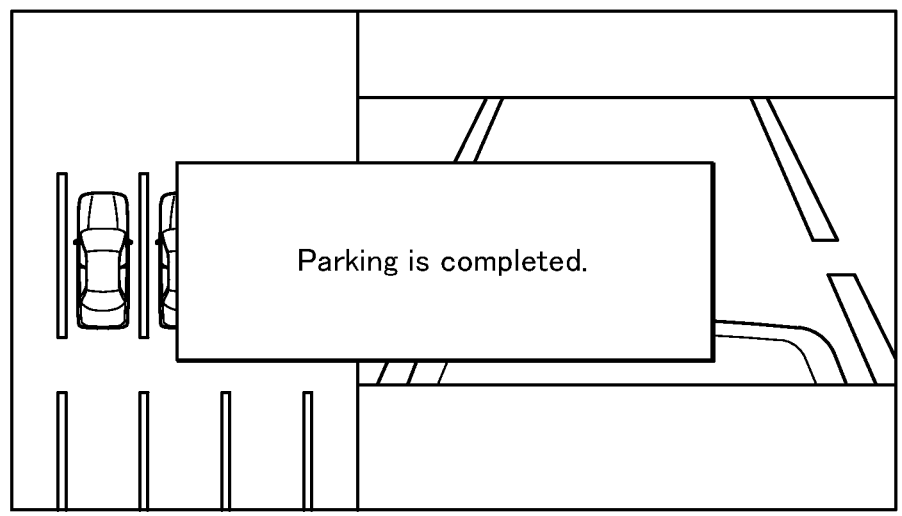
FIG. 3C is a diagram showing the screen display (parking screen) of the touch panel when automatic parking of the vehicle is completed.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and causes the touch panel 32 to display a pop-up window (see FIG. 3C) indicating that the automatic parking of the vehicle has been completed. The pop-up window may be displayed on the screen of the touch panel 32 for a prescribed period. Thereafter, the action plan unit 43 may cause the touch panel 32 to switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may cause the touch panel 32 to display the cause of the abnormality on the screen thereof.

Next, the extraction process will be described in more detail. In the extraction process, the action plan unit 43 acquires the positions of the parking space lines 55 from the external environment recognizing unit 41, determines the parking type including the angle parking and the perpendicular parking, and sets at least one parking space candidate 60. In order to execute such a process, as shown in FIG. 1, the action plan unit 43 includes a virtual line calculating unit 61, an angle calculating unit 62, a parking type determining unit 63, and a parking space candidate setting unit 64, which are functional units.

The virtual line calculating unit 61 acquires the moving direction image and the parking space lines 55 from the external cameras 19. When two or more of the parking space lines 55 cannot be acquired, the virtual line calculating unit 61 does not calculate the virtual line 57. When three or more of the parking space lines 55 can be acquired, the virtual line calculating unit 61 calculates the virtual line 57 connecting the roadway side ends (namely, the ends on a side of the roadway 56) of the parking space lines 55 adjacent to each other. The virtual line calculating unit 61 may calculate the virtual line 57 by connecting a roadway side end of one parking space line 55 (hereinafter referred to as "the second parking space line 55B") and a roadway side end of another parking space line 55 (hereinafter referred to as "the third parking space line 55C"). The second parking space line 55B is a parking space line 55 arranged second from the vehicle toward the moving direction thereof, and the third parking space line 55C is a parking space line 55 arranged third from the vehicle toward the moving direction thereof. Namely, the second parking space line 55B and the third parking space line 55C are adjacent to each other.

At this time, the virtual line calculating unit 61 may calculate segments connecting the roadway side ends of two adjacent parking space lines 55 for each combination thereof, and determine whether the calculated segments are located on substantially the same straight line. At this time, the virtual line calculating unit 61 may also determine whether the segments have substantially the same length. When the segments are located on substantially the same straight line and have substantially the same length, the virtual line calculating unit 61 may output one of the segments as the virtual line 57.

The angle calculating unit 62 calculates the parking angle $\delta$ by using the angle $\theta$ between the virtual line 57 calculated by the virtual line calculating unit 61 and the parking space line 55. More specifically, when the virtual line 57 calculated by the virtual line calculating unit 61 connects the roadway side end of the second parking space line 55B and the roadway side end of the third parking space line 55C, the angle calculating unit 62 calculates the angle $\theta$ between the second parking space line 55B or the third parking space line 55C and the virtual line 57, and sets the calculated angle $\theta$ as the parking angle $\delta$.

When three or more of the parking space lines 55 are acquired by the virtual line calculating unit 61 and the parking angle $\delta$ calculated by the angle calculating unit 62 is within a prescribed first angle range, the parking type determining unit 63 determines the parking type as the angle parking. On the other hand, when three or more of the parking space lines 55 are acquired by the virtual line calculating unit 61 and the parking angle $\delta$ is within a prescribed second angle range, the parking type determining unit 63 determines the parking type as the perpendicular parking. The first angle range is a prescribed angle range greater than 0 degrees and less than 90 degrees. In the present embodiment, the first angle range includes one prescribed angle range including 45 degrees (an angle range between 45±5 degrees) and another prescribed angle range including 60 degrees (an angle range between 60±5 degrees). The second angle range includes 90 degrees and excludes the first angle range. In the present embodiment, the second angle range is set to a prescribed angle range including 90 degrees (an angle range between 90±5 degrees).

In a case where only two or less of the parking space lines 55 are acquired by the virtual line calculating unit 61 (for example, no parking space line 55 is acquired by the virtual line calculating unit 61 and thus the virtual line 57 is not calculated), the parking type determining unit 63 does not determine the parking type.

The parking space candidate setting unit 64 sets at least one rectangular provisional parking space 52X in an area between the parking space lines 55 based on the positions of the parking space lines 55. The provisional parking space 52X is a space that can be the parking space candidate 60. More specifically, the parking space candidate setting unit 64 first sets the provisional parking space 52X between two adjacent parking space lines 55 arranged in front of the vehicle.

Incidentally, when the parking type is the angle parking, the parking space candidate setting unit 64 sets the provisional parking space 52X such that the vehicle is parked farther from the roadway 56 than the roadway side ends of the two parking space lines 55. More specifically, the parking space candidate setting unit 64 calculates straight lines $L_1$ and $L_2$ passing through the roadway side ends of the two parking space lines 55 and arranged orthogonally to the extending direction of the two parking space lines 55. After that, the parking space candidate setting unit 64 selects a far side straight line (a straight line farther from the roadway 56; namely, $L_2$) from the two straight lines $L_1$ and $L_2$, and sets the provisional parking space 52X at a position farther from the roadway 56 than the far side straight line. Alternatively, the parking space candidate setting unit 64 may set the provisional parking space 52X such that a roadway side end (namely, an end on a side of the roadway 56) of the provisional parking space 52X matches the far side straight line (namely, $L_2$) of the two straight lines $L_1$ and $L_2$. Alternatively, the parking space candidate setting unit 64 may estimate a starting position (a position where the vehicle starts to move backward; see a two-dot chain line in FIG. 4) in front of the two parking space lines 55 in the extending direction thereof, and set the provisional parking space 52X such that the provisional parking space 52X is positioned more backward than the starting position and the roadway side ends of the two parking space lines 55.

On the other hand, when the parking type is the perpendicular parking, the parking space candidate setting unit 64 sets the provisional parking space 52X such that a road way side end (namely, an end on a side of the roadway 56) of the parked vehicle matches one of the roadway side ends of the two parking space lines 55 to be closer to the roadway 56 than the other. More specifically, the parking space candidate setting unit 64 calculates straight lines $M_1$ and $M_2$ passing through the roadway side ends of the two parking space lines 55 and arranged orthogonally to the extending direction of the two parking space lines 55. After that, the parking space candidate setting unit 64 may set the provisional parking space 52X such that the roadway side end of the provisional parking space 52X matches a close side straight line (a straight line closer to the roadway 56; namely, $M_1$) of the two straight lines $M_1$ and $M_2$. Alternatively, the parking space candidate setting unit 64 may estimate a starting position (a position where the vehicle starts to move backward; see a two-dot chain line in FIG. 5A) in front of the two parking space lines 55 in the extending direction thereof, and set the provisional parking space 52X such that the roadway side end of the vehicle is positioned more backward than the starting position and matches the ends of the two parking space lines 55.

Further, when only two of the parking space lines 55 are acquired by the virtual line calculating unit 61, as in a case where the parking type is the perpendicular parking, the parking space candidate setting unit 64 sets the provisional parking space 52X such that the road way side end of the parked vehicle matches one of the roadway side ends of the two parking space lines 55 to be closer to the roadway 56 than the other.

Next, the parking space candidate setting unit 64 executes a determination process to determine whether each provisional parking space 52X is suitable for the parking space candidate 60. In the determination process, upon determining that the provisional parking space 52X is suitable for the parking space candidate 60, the parking space candidate setting unit 64 outputs this provisional parking space 52X as the parking space candidate 60. Incidentally, when the parking type determining unit 63 cannot determine the parking type, the parking space candidate setting unit 64 performs an output corresponding to a fact that the parking space candidate 60 cannot be set.

More specifically, in the determination process in a case where the parking type determined by the parking type determining unit 63 is the angle parking, the parking space candidate setting unit 64 determines that the provisional parking space 52X (hereinafter referred to as "the closest provisional parking space 52X") set between one parking space line 55 (hereinafter referred to as "the first parking space line 55A") and the second parking space line 55B is not suitable for the parking space candidate 60. The first parking space line 55A is a parking space line 55 closest to the vehicle. Also, the parking space candidate setting unit 64 determines whether at least one provisional parking space 52X other than the closest provisional parking space 52X is suitable for the parking space candidate 60 based on the signals from the external cameras 19 and/or the sonars 18. In a case where there is no obstacle to the movement and parking of the vehicle (for example, no obstacle is detected in the provisional parking space 52X), the parking space candidate setting unit 64 determines that the vehicle can be parked in the provisional parking space 52X (namely, the provisional parking space 52X is suitable for the parking space candidate 60). On the other hand, in a case where there is an obstacle to the movement or parking of the vehicle, the parking space candidate setting unit 64 determines that the vehicle cannot be parked in the provisional parking space 52X (namely, the provisional parking space 52X is not suitable for the parking space candidate 60).

In the determination process in a case where the parking type determined by the parking type determining unit 63 is the perpendicular parking, the parking space candidate setting unit 64 includes the closest provisional parking space 52X in the provisional parking space 52X for which the abovementioned determination of suitability is made. In a case where there is no obstacle to the movement and parking of the vehicle (for example, no obstacle is detected in the provisional parking space 52X), the parking space candidate setting unit 64 determines that the provisional parking space 52X is suitable for the parking space candidate 60. On the other hand, in a case where there is an obstacle to the movement or parking of the vehicle, the parking space candidate setting unit 64 determines that the provisional parking space 52X is not suitable for the parking space candidate 60.

Next, the extraction process executed by the action plan unit 43 will be described with reference to FIG. 6. In the first step ST11 of the extraction process, the action plan unit 43 (more specifically, the virtual line calculating unit 61) acquires (extracts) the moving direction image and the parking space lines 55. Upon completing this acquisition, the action plan unit 43 executes step ST12.

In step ST12, the action plan unit 43 (the virtual line calculating unit 61) determines whether three or more of the parking space lines 55 have been acquired. When three or more of the parking space lines 55 have been acquired, the action plan unit 43 executes step ST13. When three or more of the parking space lines 55 have not been acquired, the action plan unit 43 executes step ST14.

In step ST13, the action plan unit 43 (the virtual line calculating unit 61) calculates the virtual line 57 connecting the roadway side ends of the parking space lines 55 adjacent to each other. Upon completing this calculation, the action plan unit 43 executes step ST15.

In step ST14, the action plan unit 43 (the virtual line calculating unit 61) determines whether two of the parking space lines 55 have been acquired. When two of the parking space lines 55 have been acquired, the action plan unit 43 executes step ST16. When two of the parking space lines 55 have not been acquired, the action plan unit 43 executes step ST17.

In step ST15, the action plan unit 43 (the angle calculating unit 62) determines the angle θ (namely, the parking angle δ) between the parking space line 55 and the virtual line 57. Next, the action plan unit 43 (the parking type determining unit 63) determines whether the angle θ (the parking angle δ) is within the first angle range (namely, one angle range between 45±5 degrees or another angle range between 60±5 degrees). In a case where the angle θ (the parking angle δ) is within the first angle range, the action plan unit 43 determines the parking type as the angle parking, and executes step ST18. When the angle θ (the parking angle δ) is outside the first angle range, the action plan unit 43 executes step ST19.

In step ST16, the action plan unit 43 (the parking space candidate setting unit 64) sets the provisional parking space 52X between the two parking space lines 55. In the present embodiment, as in a case where the parking type is the perpendicular parking, the action plan unit 43 (the parking space candidate setting unit 64) sets the provisional parking space 52X such that the road way side end of the parked vehicle matches one of the roadway side ends of the two parking space lines 55 to be closer to the roadway 56 than the other. After that, the action plan unit 43 (the parking space candidate setting unit 64) executes the determination process for the provisional parking space 52X. In a case where the provisional parking space 52X is suitable for the parking space candidate 60, the action plan unit 43 sets the provisional parking space 52X to the parking space candidate 60, and ends the extraction process.

In step ST17, the action plan unit 43 (the parking space candidate setting unit 64) determines that the parking space candidate 60 cannot be acquired (the parking space candidate 60 is not present), and ends the extraction process.

In step ST18, the action plan unit 43 (the parking space candidate setting unit 64) sets the provisional parking space 52X between the two parking space lines 55. At this time, since the parking type is the angle parking, the action plan unit 43 sets the provisional parking space 52X such that the vehicle is parked farther from the roadway 56 than the roadway side ends of the two parking space lines 55 (see FIG. 4). After that, the action plan unit 43 (the parking space candidate setting unit 64) executes the determination process for each provisional parking space 52X. At this time, the closest provisional parking space 52X (namely, the provisional parking space 52X closest to the vehicle) is determined to be not suitable for the parking space candidate 60. Thereby, the action plan unit 43 (the parking space candidate setting unit 64) extracts an available provisional parking space 52X (namely, the provisional parking space 52X where the vehicle can be parked) from among at least one provisional parking space 52X arranged more forward than the vehicle body and the closest provisional parking space 52X (namely, at least one provisional parking space 52X excluding the closest provisional parking space 52X). Then, the action plan unit 43 sets the extracted provisional parking space 52X to the parking space candidate 60, and ends the extraction process.

In step ST19, the action plan unit 43 (the angle calculating unit 62) determines the parking angle δ. Next, the action plan unit 43 (the parking type determining unit 63) determines whether the angle θ (the parking angle δ) is within the second angle range (namely, the angle range between 90±5 degrees). In a case where the angle θ is within the second angle range, the action plan unit 43 determines the parking type as the perpendicular parking, and executes step ST20. In a case where the angle θ is outside the second angle range, the action plan unit 43 determines that the parking type is unknown, and executes step ST16.

In step ST20, the action plan unit 43 (the parking space candidate setting unit 64) sets the provisional parking space 52X between the two parking space lines 55. At this time, since the parking type is the perpendicular parking, the action plan unit 43 sets the provisional parking space 52X such that the road way side end of the parked vehicle matches one of the ends of the two parking space lines 55 to be closer to the roadway 56 than the other. After that, the action plan unit 43 (the parking space candidate setting unit 64) executes the determination process for each provisional parking space 52X. At this time, in a case where the vehicle can be parked in the closest provisional parking space 52X, the closest provisional parking space 52X is determined to be suitable for the parking space candidate 60. Namely, the action plan unit 43 (the parking space candidate setting unit 64) extracts an available provisional parking space 52X (namely, the provisional parking space 52X where the vehicle can be parked) from among at least one provisional parking space 52X arranged more forward than the vehicle body (namely, at least one provisional parking space 52X including the closest provisional parking space 52X). Then, the action plan unit 43 sets the extracted provisional parking space 52X to the parking space candidate 60, and ends the extraction process.

When the extraction process is completed, the action plan unit 43 ends the acquisition process and executes the target parking space reception process. At this time, in a case where the parking space candidate 60 has been acquired, the action plan unit 43 causes the touch panel 32 to display the parking space candidate 60 and receive the selection operation of the target parking space 53. In a case where the parking space candidate 60 has not been acquired (for example, in a case where the parking space candidate 60 is not present in step ST17), the action plan unit 43 causes the touch panel 32 to display a fact that the parking space candidate 60 has not been found. Alternatively, the action plan unit 43 may cause the touch panel 32 to display the fact that the search for the parking space candidate 60 is continued without causing the touch panel 32 to display the parking space candidate 60 or the fact that the parking space candidate 60 has not been found.

Next, the effect of the parking assist system 1 configured in this way will be described. In steps ST15 and ST19, the parking type of the vehicle is determined based on the virtual line 57 and the parking space lines 55. Accordingly, the parking type is determined based on not the moving direction of the vehicle but the shapes of the parking space lines 55, so that misidentification of the parking type can be prevented.

Even if only two of the parking space lines 55 can be recognized (Yes in ST14), the provisional parking space 52X can be set between the parking space lines 55. Accordingly, the parking space candidate 60 is presented more easily, so that the convenience of the vehicle is enhanced.

In steps ST16, ST18, and ST20, at least one provisional parking space 52X is set between the parking space lines 55, and the target parking space 53 is selected from among the provisional parking space 52X. Namely, the parking space recognition system S, which includes the control device 15 and the external environment sensor 7 (the external cameras 19), recognizes the parking space 52 for parking the vehicle between the parking space lines 55, and the control device 15 includes the virtual line calculating unit 61, the angle calculating unit 62, the parking type determining unit 63, and the parking space candidate setting unit 64.

In a case where only two of the parking space lines 55 have been recognized, the parking space lines 55 in the parking lot have often faded. In such a case, the ends of the parking space lines 55 may be blurred and cannot be recognized accurately, and thus the position of the provisional parking space 52X may not be determined accurately. Accordingly, the parking position of the vehicle may be shifted excessively backward when the provisional parking space 52X is set such that the roadway side end of the parked vehicle matches one of the roadway side ends of the two parking space lines 55 to be farther from the roadway 56 than the other.

In such a case, in the present embodiment, as in a case where the parking type is the perpendicular parking, the provisional parking space 52X is set such that the roadway side end of the parked vehicle matches one of the roadway side ends of the two parking space lines 55 to be closer to the roadway 56 than the other. Accordingly, the parking position of the vehicle is prevented from being shifted excessively rearward, and the safety of the vehicle is enhanced.

The parking type is determined based on whether the angle θ (namely, the parking angle δ) between the virtual line 57 and the parking space line 55 is within the first angle range or the second angle range. Accordingly, for example, the determination of the parking type becomes simple as compared with a case where the parking space lines 55 are recognized and the parking type is determined by a method such as pattern matching.

Figure 5B:
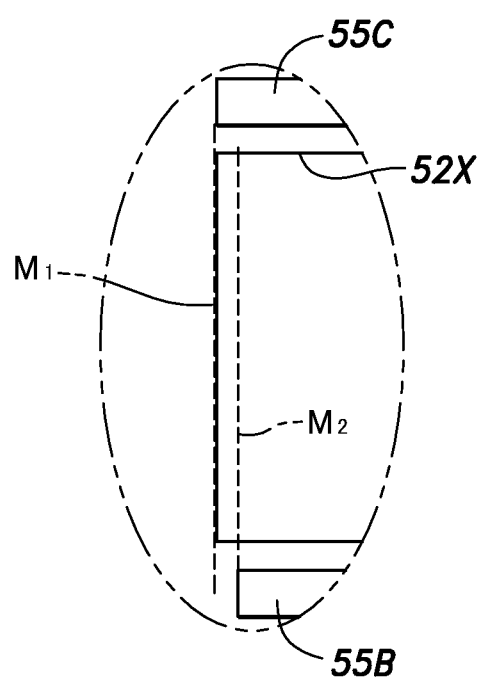
FIG. 5B is an enlarged view of a part surrounded by a two-dot chain circle in FIG. 5A.

The parking angle δ for an angle parking space 52A (namely, the parking space 52 for the angle parking; see FIG. 4) is often set to 45 degrees or 60 degrees. In the present embodiment, the first angle range is set to the angle range between 45±5 degrees and between 60±5 degrees. Accordingly, it is possible to prevent the perpendicular parking from being misidentified as the angle parking when the roadway side ends of the parking space lines 55 of a perpendicular parking space 52B (namely, the parking space 52 for the perpendicular parking; see FIGS. 5A and 5B) is blurred and their positions cannot be recognized.

Further, as shown in FIG. 4, in a parking lot where the angle parking space 52A is provided, a zebra zone 80 for preventing the entry and parking of the vehicle is frequently provided outside the parking space lines 55 located at both ends among the parking space lines 55 arranged at regular intervals. Accordingly, immediately after the vehicle enters such a parking lot, it is often difficult to recognize the roadway side end of the closest parking space line 55 (namely, the parking space line 55 closest to the vehicle) from the vehicle. Accordingly, when the angle parking is executed, the area between the closest parking space line 55 and its adjacent parking space line 55 is often not suitable for the automatic parking of the vehicle. In the present embodiment, as shown in FIG. 6, when the parking type is the angle parking (step ST15: Yes), the action plan unit 43 sets the provisional parking space 52X in areas other than the area between the closest parking space line 55 (first parking space line 55A) and its adjacent parking space line 55 (second parking space line 55B). After that, the action plan unit 43 sets the parking space candidate 60 by extracting the available provisional parking space 52X from among the set provisional parking space 52X (ST18). Accordingly, it is possible to prevent an area that is not suitable for a parking position from being set to the parking space candidate 60.

On the other hand, in a parking lot where the perpendicular parking space 52B is provided, the zebra zone 80 is infrequently provided outside the parking space lines 55 located at both ends among the parking space lines 55 arranged at regular intervals, as compared with the parking lot where the angle parking space 52A is provided. In the present embodiment, when the parking type is the perpendicular parking (step ST19: Yes), the parking space candidate setting unit 64 sets the provisional parking space 52X such that an area between the closest parking space line 55 (first parking space line 55A) and its adjacent parking space line 55 (second parking space line 55B) is included in the provisional parking space 52X to be extracted as the parking space candidate 60. Thus, it is possible to set a larger number of provisional parking spaces 52X (step ST20). Accordingly, a wider variety of the parking space candidates 60 can be presented to the user, so that the user can move the vehicle to a desired position and park the vehicle therein.

Concrete embodiments of the present invention have been described in the foregoing, but the present invention should not be limited by the foregoing embodiments and various modifications and alterations are possible within the scope of the present invention. For example, the concrete structure, arrangement, number, process content and procedure, etc. of the components/units of the embodiments may be appropriately changed within the scope of the present invention. Also, not all of the structural elements shown in the above embodiments are necessarily indispensable and they may be selectively adopted as appropriate.

In the present embodiment, the action plan unit 43 calculates the virtual line 57 and acquires the parking angle δ based on the virtual line 57. However, the present invention is not limited to this embodiment. For example, in a case where three or more of the parking space lines 55 and the extending direction of the roadway 56 can be recognized, the action plan unit 43 may first determine whether all the angles between each parking space line 55 and the extending direction of the roadway 56 are the same. After that, in a case where the intervals between the parking space lines 55 are constant on the presumption that each parking space line 55 forms the angle of 45 degrees or 60 degrees with respect to the extending direction of the roadway 56, the action plan unit 43 may set the above angle in the presumption to the parking angle δ.

In the present embodiment, when one white line is captured by the external cameras 19, the external environment recognizing unit 41 recognizes the captured one white line as one parking space line 55. However, the present invention is not limited to this embodiment. When two or more of the white lines are captured within a prescribed range by the external cameras 19, the external environment recognizing unit 41 may regard the two or more of the white lines as one white line and thus recognize one parking space line 55.

In the present embodiment, the parking assist system 1 moves the vehicle autonomously and parks the vehicle in the parking position based on the determination results such as the parking space candidate 60 set by the parking space candidate setting unit 64 and the parking type determined by the parking type determining unit 63. However, the present invention is not limited to this embodiment. The parking assist system 1 may only have a function of determining the parking type and detecting the parking space candidate 60. However, if the parking assist system 1 can move the vehicle autonomously and parks the vehicle in the parking position, the convenience of the vehicle can be improved. Further, in the present embodiment, the virtual line calculating unit 61, the angle calculating unit 62, the parking type determining unit 63, and the parking space candidate setting unit 64 are provided in the control device 15. However, the present invention is not limited to this embodiment. The virtual line calculating unit 61, the angle calculating unit 62, the parking type determining unit 63, and the parking space candidate setting unit 64 may be provided in a device (the parking space candidate detecting device) different from the control device 15.

In the present embodiment, the angle θ between the virtual line 57 and the parking space line 55 indicates the smaller of the angles therebetween and is defined as an angle equal to or more than 0 degrees and equal to or less than 90 degrees. However, the present invention is not limited to this embodiment. The angle θ between the virtual line 57 and the parking space line 55 may be defined as an angle equal to or more than 0 degrees and less than 180 degrees. In such a case, the first angle range may be defined to include one prescribed angle range including 45 degrees or 135 degrees and another prescribed angle range including 60 degrees or 120 degrees, while the second angle range may be defined as a range including 90 degrees and excluding the first angle range. In this case, as in the present embodiment, when three or more of the parking space lines 55 are recognized and the angle θ (namely, the parking angle δ) is within the first angle range, the parking type determining unit 63 may determine the parking type as the angle parking. Further, when three or more of the parking space lines 55 are recognized and the angle θ (namely, the parking angle δ) is within the second angle range, the parking type determining unit 63 may determine the parking type as the perpendicular parking.

The invention claimed is:

1. A parking space recognition system mounted on a vehicle for recognizing at least one parking space between a plurality of substantially parallel parking space lines provided on a side of a road, the parking space recognition system comprising:
    an external environment information acquiring device configured to acquire positions of the parking space lines; and
    a parking space candidate detecting device configured to detect a parking type and at least one parking space candidate based on the positions of the parking space lines, the parking type including angle parking and perpendicular parking, the parking space candidate being a candidate for an available parking area,
    wherein the parking space candidate detecting device includes:
    a virtual line calculating unit configured to calculate a virtual line connecting road side ends of the parking space lines adjacent to each other;
    an angle calculating unit configured to calculate an angle between the virtual line calculated by the virtual line calculating unit and one of the parking space lines;
    a parking type determining unit configured to determine the parking type based on the angle between the virtual line and the one of the parking space lines; and
    a parking space candidate setting unit configured to set at least one provisional parking space in an area between the parking space lines based on the positions of the parking space lines, and to set an available parking area among the provisional parking space to the parking space candidate.

2. The parking space recognition system according to claim 1, wherein when three or more of the parking space lines are recognized, the parking type determining unit determines the parking type as the angle parking or the perpendicular parking.

3. The parking space recognition system according to claim 2, wherein when the angle calculated by the angle calculating unit is within a prescribed first angle range greater than 0 degrees and less than 180 degrees, the parking type determining unit determines the parking type as the angle parking, and
    when the angle calculated by the angle calculating unit is within a second angle range including 90 degrees and excluding the first angle range, the parking type determining unit determines the parking type as the perpendicular parking.

4. The parking space recognition system according to claim 3, wherein the first angle range includes one prescribed angle range including 45 degrees or 135 degrees and another prescribed angle range including 60 degrees or 120 degrees.

5. The parking space recognition system according to claim 1, wherein when the parking type determining unit determines the parking type as the angle parking, the parking space candidate setting unit does not set the parking space candidate between a first parking space line and a second parking space line, the first parking space line being the parking space line closest to the vehicle, the second parking space line being the parking space line adjacent to the first parking space line.

6. The parking space recognition system according to claim 1, wherein when the parking type determining unit determines the parking type as the perpendicular parking, the parking space candidate setting unit sets the provisional parking space such that an area between a first parking space line and a second parking space line is included, the first parking space line being the parking space line closest to the vehicle, the second parking space line being the parking space line adjacent to the first parking space line.

7. The parking space recognition system according to claim 1, wherein in a case where at least two of the parking space lines are recognized, the parking space candidate setting unit sets the provisional parking space between the parking space lines.

8. A parking assist system for parking a vehicle in a parking space, the parking assist system comprising:

the parking space recognition system according to claim 1;
a display device configured to display the at least one parking space candidate;
a selection input member configured to receive a selection operation of a target parking space by a user from among the at least one parking space candidate displayed on the display device; and
a control device configured to execute a driving process to autonomously move the vehicle to the target parking space based on a determination result of the parking space candidate detecting device.

\* \* \* \* \*